United States Patent
Sato (10) Patent No.: US 11,926,042 B2
(45) Date of Patent: Mar. 12, 2024

(54) COMPLIANCE UNIT

(71) Applicant: SMC CORPORATION, Tokyo (JP)

(72) Inventor: Motohiro Sato, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 18/191,093

(22) Filed: Mar. 28, 2023

(65) Prior Publication Data

US 2023/0311344 A1    Oct. 5, 2023

(30) Foreign Application Priority Data

Mar. 30, 2022 (JP) .................................. 2022-055071

(51) Int. Cl.
*B25J 17/02* (2006.01)

(52) U.S. Cl.
CPC ....... *B25J 17/0275* (2013.01); *B25J 17/0208* (2013.01)

(58) Field of Classification Search
CPC B25J 17/0208; B25J 17/0225; B25J 17/0233; B25J 19/063; B25J 19/065
See application file for complete search history.

(56) References Cited

U.S. PATENT DOCUMENTS 4,439,926 A * 4/1984 Whitney ................. B23P 19/12
  901/45
5,909,941 A * 6/1999 Cheng .................. B25J 17/0208
  33/644

FOREIGN PATENT DOCUMENTS

JP    2000-153489 A    6/2000
JP     2000153489 A  * 6/2000

* cited by examiner

*Primary Examiner* — Gregory Robert Weber
(74) *Attorney, Agent, or Firm* — Oblon, McClelland, Maier & Neustadt, L.L.P.

(57) ABSTRACT

A retainer that holds a plurality of first balls is arranged between a slide body constituting a slide portion and a base plate constituting a table portion, the plurality of first balls are arranged around an axis of the slide portion that coincides with the Z-axis, and a single second ball is arranged on the axis of the slide portion between a ball receiving plate constituting the slide portion and a ball receiving plate constituting the table portion.

6 Claims, 8 Drawing Sheets

COMPLIANCE UNIT

CROSS-REFERENCE TO RELATED APPLICATIONS

This application is based upon and claims the benefit of priority from Japanese Patent Application No. 2022-055071 filed on Mar. 30, 2022, the contents of which are incorporated herein by reference.

BACKGROUND OF THE INVENTION

Field of the Invention

The present invention relates to a compliance unit that flexibly holds a workpiece and absorbs positioning errors at automatic assembly performed by a robot hand.

Description of the Related Art

Conventionally, a compliance unit has been used in order to provide a workpiece held by a robot hand with flexibility against an external action thereon.

For example, JP 2000-153489 A discloses a compliance unit in which a sliding member is disposed in a cylindrical body via a sliding element, and a table is slidably disposed inside the sliding member via a planar sliding element. The sliding member is movable in the Z direction with respect to the body, and the table is movable in the XY plane with respect to the sliding member.

SUMMARY OF THE INVENTION

According to the compliance unit above, positioning errors in the XY plane and positioning errors in the Z direction can be absorbed. However, since the table cannot be pivoted about the X-axis and the Y-axis, the table cannot absorb errors concerning an inclination.

The present invention has the object of solving the aforementioned problems.

A compliance unit including a body portion, a slide portion and a table portion, wherein a retainer that holds a plurality of first balls is arranged between the slide body constituting the slide portion and a base plate constituting the table portion, and the plurality of first balls are arranged around an axis of the slide portion that coincides with the Z axis. A single second ball is arranged on the axis line of the slide portion between a ball receiving plate constituting the slide portion and a ball receiving plate constituting the table portion. The table portion is movable in the XY plane with respect to the slide portion, and the table portion is tiltable with respect to the slide portion.

According to the compliance unit of the present invention, the table portion can be tilted with respect to the slide portion, and an error concerning the inclination can be absorbed. Further, a configuration in which the table portion can be moved relative to the slide portion in the XY plane and the table portion can be tilted relative to the slide portion can be achieved in a compact manner.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
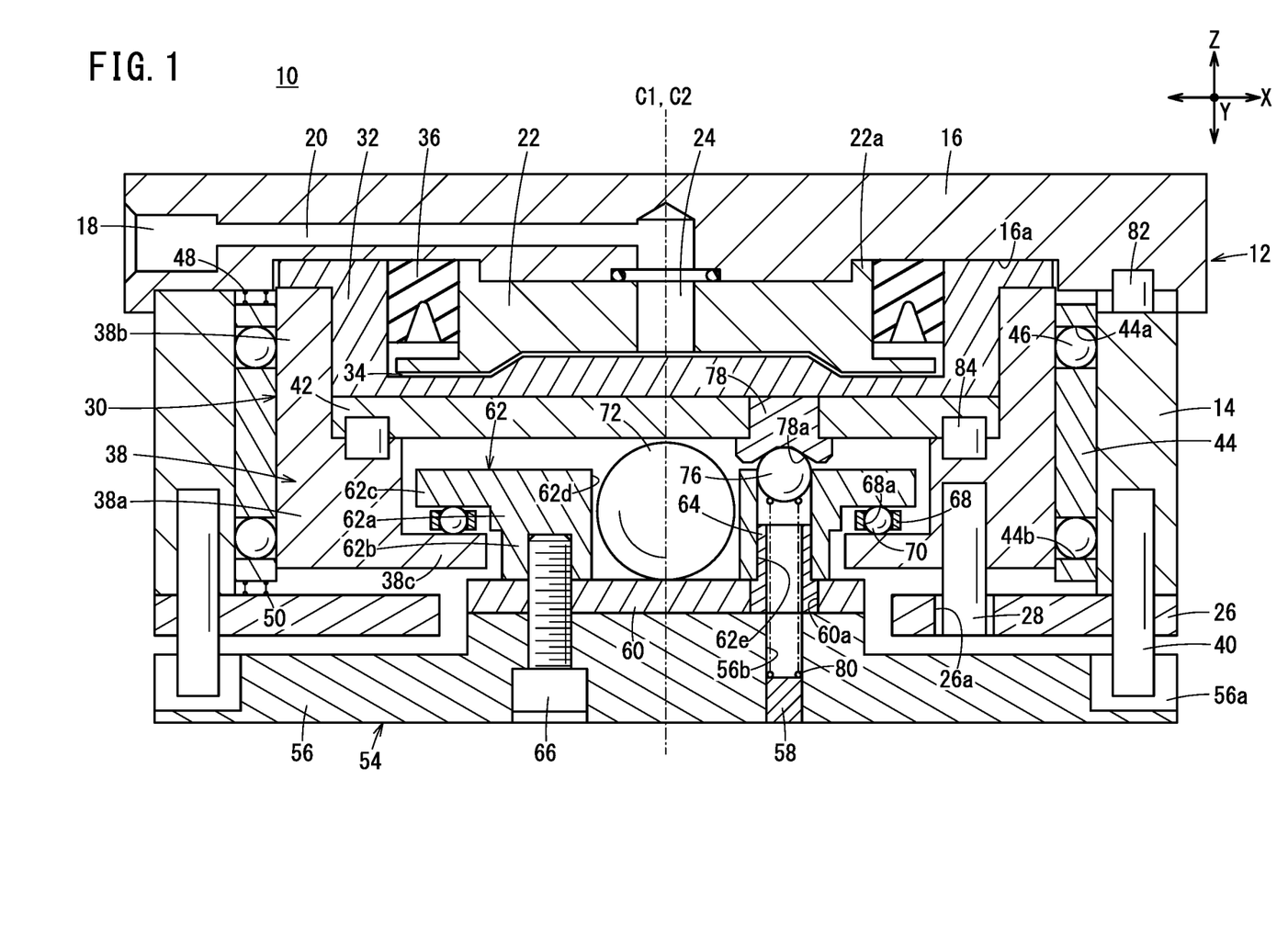
FIG. 1 is a sectional view of a compliance unit according to an embodiment of the present invention taken along a plane including an X-axis and a Z-axis.

As shown in FIG. 1, a compliance unit 10 according to an embodiment of the present invention includes a body portion 12, a slide portion 30 supported by the body portion 12, and a table portion 54 supported by the slide portion 30. The body portion 12 is attached to a robot hand (not shown). An axis C1 of the body portion 12 and the slide portion 30 coincides with the Z-axis. The slide portion 30 is movable in the Z direction with respect to the body portion 12.

The table portion 54 is movable in an X direction and a Y direction (a direction perpendicular to the paper surface) with respect to the slide portion 30, and is rotatable about an axis C1 (Z axis) of the slide portion 30. In other words, the table portion 54 is movable in the XY plane with respect to the slide portion 30. The table portion 54 is tiltable with respect to the slide portion 30. In other words, the table portion 54 can pivot about the X-axis and the Y-axis. Hereinafter, when the words relating to the up and down (vertical) directions are used, it means the direction parallel to the Z-axis. Further, when the words relating to the right and left directions are used, it means the direction parallel to the X-axis.

The body portion 12 includes a cylindrical housing 14, a rectangular cover plate 16, a disc-shaped pressure plate 22, and an annular end plate 26. The cover plate 16 is fixed to an upper portion of the housing 14. The pressure plate 22 is fixed to a lower central portion of the cover plate 16. The end plate 26 is fixed to a lower portion of the housing 14. The cover plate 16 has an annular recess 16a on a lower surface thereof, and the pressure plate 22 has an annular fitting portion 22a at an upper portion thereof. The fitting portion 22a of the pressure plate 22 is fitted into the inner periphery of the recess 16a of the cover plate 16.

The slide portion 30 is accommodated in the body portion 12. The slide portion 30 includes a bottomed cylindrical cylinder body 32, a cylindrical slide body 38, and a circular ball receiving plate 42. The upper surface of the cylinder body 32 can abut on the bottom surface of the recess 16a of the cover plate 16. The slide body 38 has a thick portion 38a, a fitting portion 38b extending upward from the upper surface of the thick portion 38a, and a flange portion 38c projecting radially inward from a lower portion of the thick portion 38a. The fitting portion 38b of the slide body 38 is press-fitted and fitted to the outer side of the cylinder body 32. The ball receiving plate 42 is sandwiched between the lower surface of the cylinder body 32 and the upper surface of the thick portion 38a of the slide body 38.

A cylindrical first retainer 44 is disposed between the inner peripheral surface of the housing 14 and the outer peripheral surface of the slide body 38. The first retainer 44 has upper ball receiving holes 44a arranged in the circumferential direction and lower ball receiving holes 44b arranged in the circumferential direction. The upper ball receiving hole 44a and the lower ball receiving hole 44b penetrate the wall surface of the first retainer 44 in the radial direction. Guide balls 46 are arranged in the upper ball receiving hole 44a and the lower ball receiving hole 44b, and the first retainer 44 holds the multiple guide balls 46. The diameter of the guide ball 46 is slightly larger than the wall thickness of the first retainer 44.

The guide balls 46 come into contact with the inner peripheral surface of the housing 14 and also come into contact with the outer peripheral surface of the slide body 38. First springs 48 for urging the first retainer 44 downward are disposed between the first retainer 44 and the cover plate 16. Second springs 50 for urging the first retainer 44 upward are disposed between the first retainer 44 and the end plate 26. The first retainer 44 is held at a position separated from the cover plate 16 and the end plate 26 by the urging forces of the first spring 48 and the second spring 50.

The guide balls 46 roll on the inner peripheral surface of the housing 14 and the outer peripheral surface of the slide body 38, whereby the slide portion 30 can move smoothly in the Z direction with respect to the body portion 12. When the slide portion 30 moves relative to the body portion 12 while the guide balls 46 roll on the inner peripheral surface of the housing 14 and the outer peripheral surface of the slide body 38, the first retainer 44 also moves in the same direction.

Figure 7:
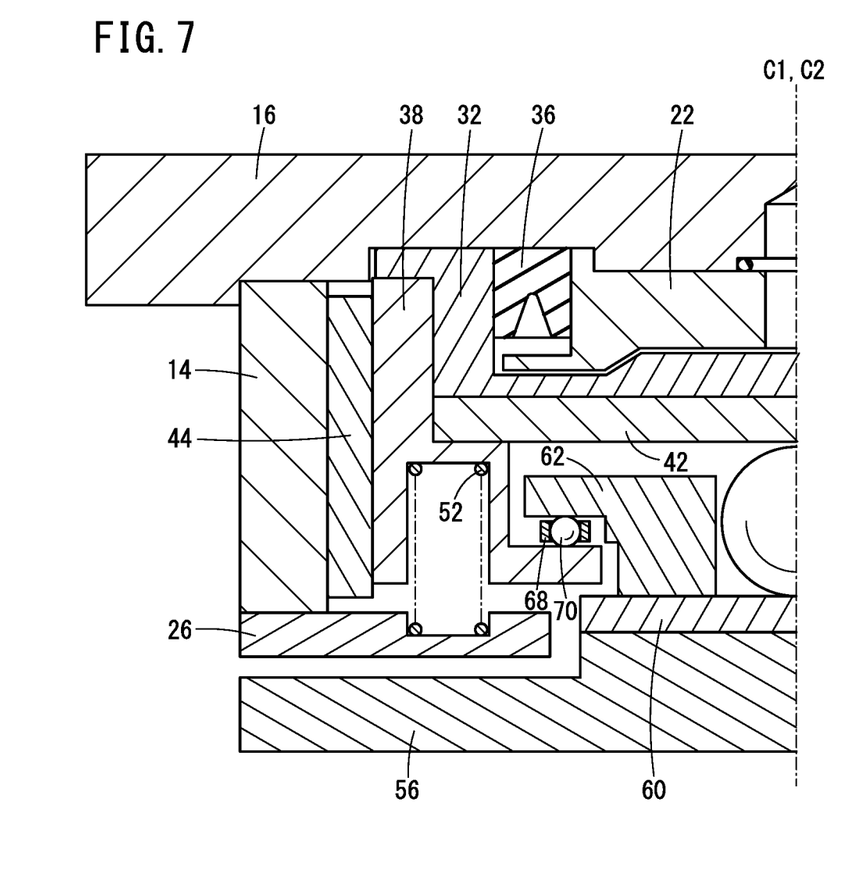
FIG. 7 is part of a cross-sectional view of the compliance unit of FIG. 1 cut in a plane including the Z-axis but not including the X-axis.

The distance from the upper surface of the cylinder body 32 to the lower surface of the slide body 38 (the height of the slide portion 30) is shorter by L1 than the distance from the bottom surface of the recess 16a of the cover plate 16 to the upper surface of the end plate 26 (the height of the internal space of the body portion 12). The maximum movement amount of the table portion 54 in the Z direction with respect to the slide portion 30 is equal to L1. Between the end plate 26 and the slide body 38, a slide portion urging spring 52 for urging the slide portion 30 upward with respect to the body portion 12 is disposed (see FIG. 7).

The pressure plate 22 enters into the inner side of the cylinder body 32. A cylindrical packing 36 is mounted on the outer periphery of the pressure plate 22. The upper surface of the packing 36 is in close contact with the lower surface of the cover plate 16, and the outer peripheral surface of the packing 36 is in sliding contact with the inner peripheral surface of the cylinder body 32. A pressure chamber 34 that is kept airtight from the outside is formed between the pressure plate 22 and the cylinder body 32.

The cover plate 16 has an air supply and discharge port 18 connected to an air supply source (not shown) and an air passage 20 extending from the air supply and discharge port 18. An end portion of the air passage 20 of the cover plate 16 opens at the lower surface of the cover plate 16. The pressure plate 22 has at a central portion thereof an air passage 24 penetrating in the vertical direction. The air passage 24 of the pressure plate 22 is connected at an upper end thereof to the air passage 20 of the cover plate 16 and at a lower end thereof to the pressure chamber 34.

When air is supplied to the pressure chamber 34 through the supply and discharge port 18 of the cover plate 16, the slide portion 30 is urged downward. This urging force not only opposes the urging force of the slide portion urging spring 52 but also opposes an external force acting on the table portion 54. By adjusting the air pressure supplied to the pressure chamber 34, it is possible to control the pressing force of the table portion 54, whereby a desired buffering action can be obtained.

The slide body 38 includes a regulating pin 28 projecting downward from the lower surface of the slide body 38. The end plate 26 has a regulating hole 26a at a position corresponding to the regulating pin 28 of the slide body 38. The regulating pin 28 of the slide body 38 engages with the regulating hole 26a of the end plate 26. Thus, the pivoting of the slide portion 30 relative to the body portion 12 is restricted.

The table portion 54 includes a disc-shaped table body 56, a circular ball receiving plate 60, and a cylindrical base plate 62. The ball receiving plate 60 is disposed at an upper central portion of the table body 56, and the base plate 62 is disposed on the upper side of the ball receiving plate 60. The table body 56, the ball receiving plate 60, and the base plate 62 are integrally connected with a bolt 66. The base plate 62 is disposed on an inner side of the slide body 38. The base plate 62 includes a large-diameter portion 62a, a small-diameter portion 62b extending downward from the large-diameter portion 62a, and a flange portion 62c projecting radially outward from an upper portion of the large-diameter portion 62a.

The outer diameter of the flange portion 62c of the base plate 62 is smaller by L2 than the inner diameter of the thick portion 38a of the slide body 38. A gap is formed between the outer periphery of the flange portion 62c of the base plate 62 and the inner periphery of the thick portion 38a of the slide body 38. The outer diameter of the small-diameter portion 62b of the base plate 62 is smaller by L2 than the inner diameter of the flange portion 38c of the slide body 38. A gap is formed between the outer periphery of the small-diameter portion 62b of the base plate 62 and the inner periphery of the flange portion 38c of the slide body 38. The maximum movement amount of the table portion 54 in the X direction and the Y direction relative to the slide portion 30 is equal to L2.

The flange portion 62c of the base plate 62 is positioned above the flange portion 38c of the slide body 38. An annular second retainer 68 is disposed between the flange portion 62c of the base plate 62 and the flange portion 38c of the slide body 38. The second retainer 68 has multiple ball receiving holes 68a arranged in the circumferential direction. A first ball 70 is arranged in each ball receiving hole 68a of the second retainer (68), whereby multiple first balls 70 are held by the second retainer 68. The first balls 70 are arranged around the axis C1 of the slide portion 30.

The first ball 70 comes into contact with the upper surface of the flange portion 38c of the slide body 38. The first ball 70 can be brought into contact with the lower surface of the flange portion 62c of the base plate 62. The first ball 70 rolls on the upper surface of the flange portion 38c of the slide body 38 and the lower surface of the flange portion 62c of the base plate 62, whereby the table portion 54 can move smoothly in the XY plane with respect to the slide portion 30.

The base plate 62 has at a central portion thereof a first hole 62d penetrating in the vertical direction. A second ball 72 is accommodated in the first hole 62d of the base plate 62. That is, between the ball receiving plate 60 of the table portion 54 and the ball receiving plate 42 of the slide portion 30, the single second ball 72 is disposed on the axis C1 of the slide portion 30. The diameter of the second ball 72 is several times larger than the diameter of the first ball 70. The second ball 72 comes into contact with the upper surface of the ball receiving plate 60 of the table portion 54. Further, the second ball 72 protrudes upward from the first hole 62d of the base plate 62 and can abut on the lower surface of the ball receiving plate 42 of the slide portion 30.

The posture of the table portion 54 can be changed so that the axis C2 of the table portion 54 intersects the axis C1 of the slide portion 30. That is, the table portion 54 can be tilted with respect to the slide portion 30. When the table portion 54 is tilted with respect to the slide portion 30 in a state in which an external force is applied to the table portion 54, the second ball 72 comes into contact with the ball receiving plate 60 of the table portion 54 and the ball receiving plate 42 of the slide portion 30. In this case, only part of the plurality of first balls 70 comes into contact with the flange portion 62c of the base plate 62, and the first balls are sandwiched between the flange portion 62c of the base plate 62 and the flange portion 38c of the slide body 38 (see FIG. 5).

Figure 8:
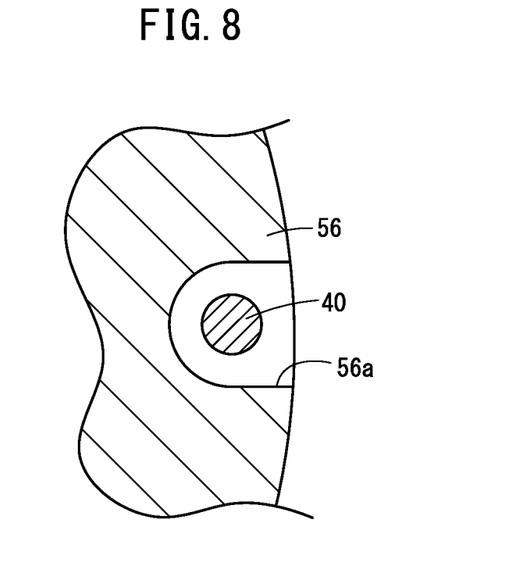
FIG. 8 is a view showing the relationship between the regulating pin of the body portion and the notch groove of the table body.

The body portion 12 is provided with a regulating pin 40 projecting downward from the lower surface of the end plate 26. The table body 56 has a notch groove 56a at a position corresponding to the regulating pin 40 of the body portion 12. The regulating pin 40 of the body portion 12 is inserted into the notch groove 56a of the table body 56, and a predetermined gap is formed around the outer periphery of the regulating pin (see FIG. 8). Therefore, the table portion 54 can be rotated by a predetermined angle around the axis C1 (Z axis) of the body portion 12 and the slide portion 30.

The compliance unit 10 is provided with a return mechanism that returns the table portion 54 to the origin position with respect to the slide portion 30 and returns the table portion 54 to the original posture with respect to the slide portion 30. The return mechanism includes a return ball 76, a ball receiving body 78, and a return spring 80.

The base plate 62 has multiple (e.g., three) second holes 62e penetrating in the vertical direction around the first hole 62d. The ball receiving plate 60 of the table portion 54 has holes 60a at positions corresponding to the second holes 62e of the base plate 62. The table body 56 has holes 56b at positions corresponding to the second holes 62e of the base plate 62. A spring insertion sleeve 64 is mounted through both the second hole 62e of the base plate 62 and the hole 60a of the ball receiving plate 60.

A lower end of the return spring 80 inserted into the sleeve 64 engages with a plug 58 attached to a lower portion of the hole 56b of the table body 56. The upper end of the return spring 80 comes into contact with the return ball 76 accommodated in an upper portion of the second hole 62e of the base plate 62. The ball receiving body 78 includes a tapered ball receiving surface 78a spreading downward, and is attached to the ball receiving plate 42 of the slide portion 30. The return ball 76 urged upward by the return spring 80 comes into contact with the ball receiving surface 78a of the ball receiving plate 42.

A plurality of return balls 76 urged in a direction parallel to the axis C1 of the slide portion 30 come into contact with a tapered ball receiving surface 78a of the ball receiving body 78. Therefore, when no external force acts on the table body 56, the axis C2 of the table portion 54 coincides with the axis C1 of the slide portion 30. That is, the table portion 54 is held at the origin on the XY plane with respect to the slide portion 30, and the table portion 54 is held in a posture that is not tilted with respect to the slide portion 30.

The table portion 54 is held at the origin on the XY plane with respect to the slide portion 30 because the return ball 76 tends to come into contact with the apex (center) of the tapered ball receiving surface 78a. The reason why the table portion 54 is maintained in a posture that is not tilted with respect to the slide portion 30 is that if the table portion 54 stays tilted with respect to the slide portion 30, repulsive forces of multiple return springs 80 are different from each other, and a moment for correcting the inclination acts.

The return spring 80 serves to urge the table body 56 downward via the plug 58. In a state where no external force acts on the table body 56, the first balls 70 are held between the flange portion 38c of the slide body 38 and the flange portion 62c of the base plate 62 integrated with the table body 56 by the urging force of the return spring 80. Reference numeral 82 denotes a positioning pin for attaching the cover plate 16 to the housing 14. Reference numeral 84 denotes a positioning pin for attaching the ball receiving plate 42 of the slide portion 30 to the slide body 38.

The compliance unit 10 according to the embodiment of the present invention is basically configured as described above, and the operation thereof will be described below. A state in which no air is supplied to the pressure chamber 34 and no external force acts on the table portion 54 is set as an initial state (see FIG. 1).

In the initial state, the cylinder body 32 is brought into contact with the bottom surface of the recess 16a of the cover plate 16 by the urging force of the slide portion urging spring 52. That is, the slide portion 30 has been moved to the upper end with respect to the body portion 12. Further, the axis C2 of the table portion 54 coincides with the axis C1 of the slide portion 30 because of the function of the return mechanism. The plurality of first balls 70 are held between the flange portion 62c of the base plate 62 and the flange portion 38c of the slide body 38 by the urging force of the return spring 80. At this time, the second ball 72 is not in contact with the ball receiving plate 42 of the slide portion 30.

Figure 2:
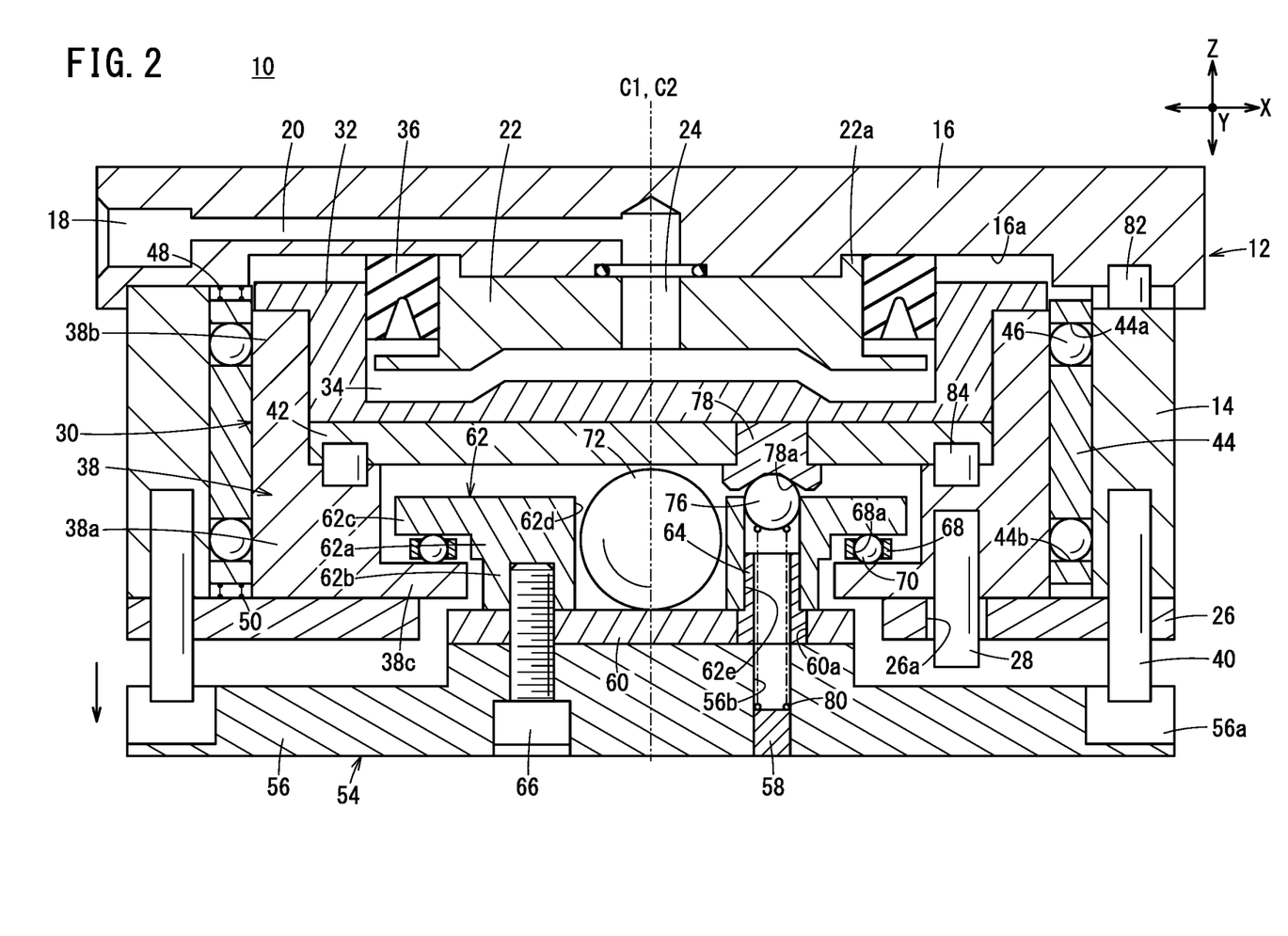
FIG. 2 is a sectional view when air is supplied to the compliance unit shown in FIG. 1.

When air is supplied to the pressure chamber 34 at the initial state, the slide portion 30 is urged downward. As shown in FIG. 2, the slide portion 30 moves to the lower end against the slide portion urging spring 52, and the slide body 38 comes into contact with the end plate 26. When the slide portion 30 moves downward, the guide ball 46 rolls on the inner peripheral surface of the housing 14 and the outer peripheral surface of the slide body 38.

Figure 3:
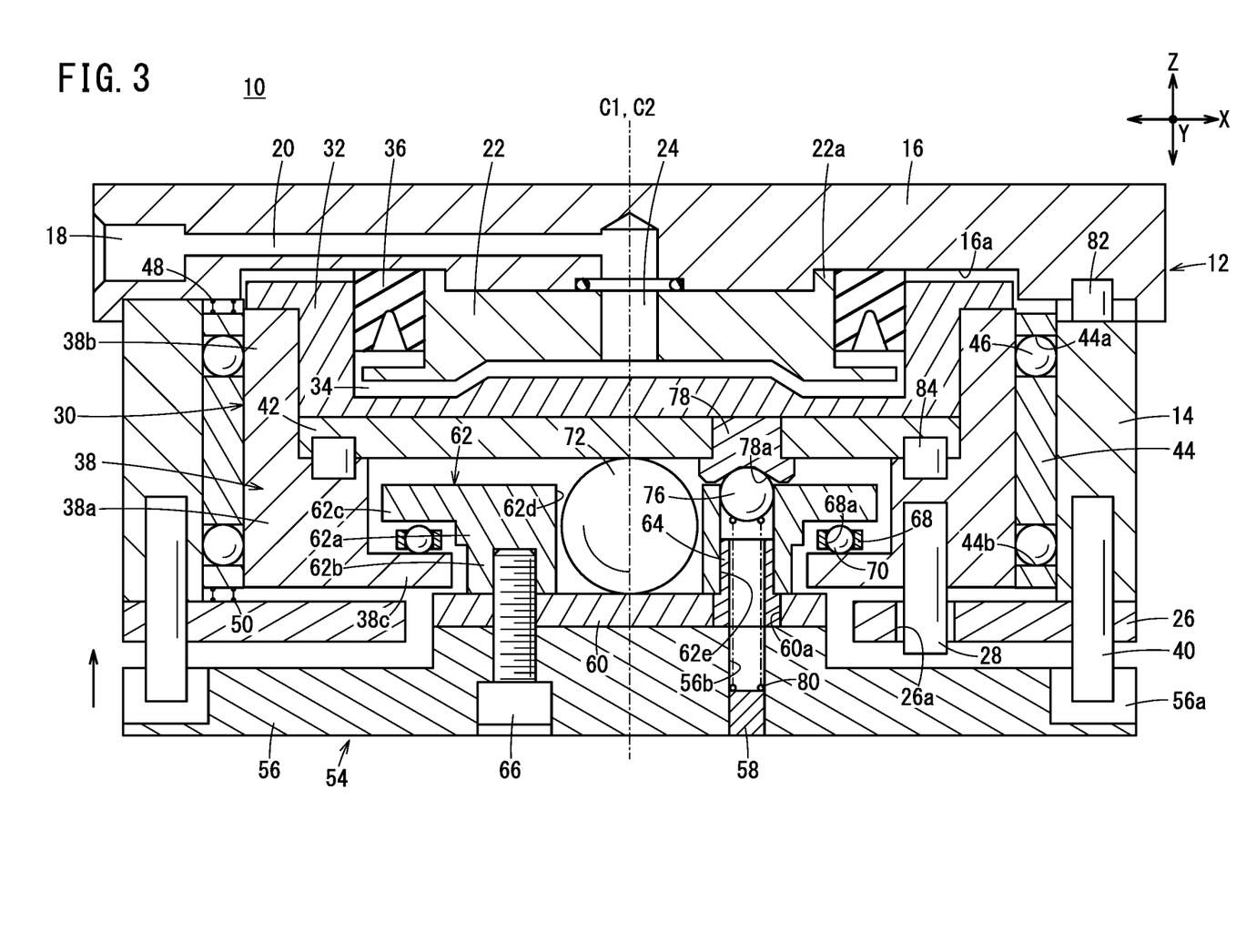
FIG. 3 is a sectional view when a pressing force is applied to the table portion of the compliance unit shown in FIG. 1.

In this state, when the table body 56 is pressed against a workpiece (not shown), an external force acting as a reaction force of the pressing force acts on the table body 56. Therefore, as shown in FIG. 3, the table portion 54 moves upward with respect to the slide portion 30, and together therewith, the slide portion 30 moves upward with respect to the body portion 12. Movement of the table portion 54 relative to the slide portion 30 is accompanied by compression of the return spring 80. The second ball 72 abuts against the ball receiving plate 42 of the slide portion 30. The flange portion 62c of the base plate 62 moves apart from the first balls 70.

An external force acting on the table body 56 is applied to the slide portion 30 via the return ball 76 and the second ball 72, whereby the slide portion 30 moves upward with respect to the body portion 12. At this time, the combined force of the external force acting on the table body 56 and the force by which the slide portion urging spring 52 urges the table portion 54 upward is balanced with the force by which the air pressure in the pressure chamber 34 urges the table portion 54 downward. That is, a pressing force commensurate with the air pressure supplied to the pressure chamber 34 is applied to the table portion 54. When the slide portion 30 moves upward relative to the body portion 12, the guide balls 46 roll on the inner peripheral surface of the housing 14 and the outer peripheral surface of the slide body 38.

Figure 4:
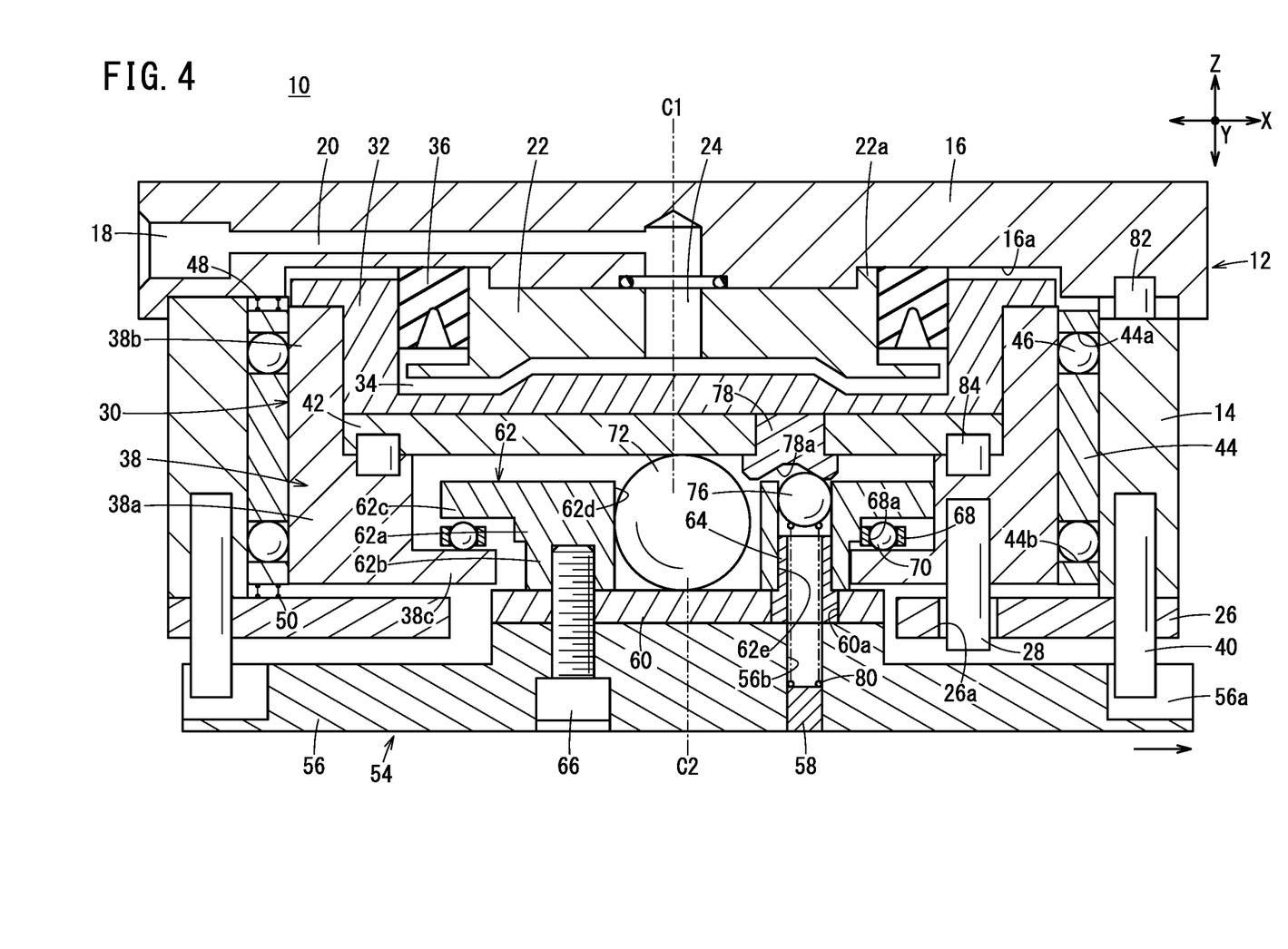
FIG. 4 is a sectional view when the compliance unit of FIG. 1 absorbs an error in the X-direction.

The compliance unit 10 can absorb an error in the XY plane in a state in which a pressing force is applied to the table portion 54. FIG. 4 shows a state in which the table portion 54 has moved to the right end and has absorbed the error in the X direction to the maximum. As shown in the figure, the outer periphery of the flange portion 62c of the base plate 62 abuts against the inner periphery of the thick portion 38a of the slide body 38, and the outer periphery of the small diameter portion 62b of the base plate 62 abuts against the inner periphery of the flange portion 38c of the slide body 38. Further, the return ball 76 is in contact with the ball receiving surface 78a at a position away from the apex of the ball receiving surface 78a.

When the table portion 54 moves rightward in a state in which a pressing force is applied to the table portion 54, the second ball 72 rolls on the upper surface of the ball receiving plate 60 of the table portion 54 and the lower surface of the ball receiving plate 42 of the slide portion 30. Because the second ball 72 has a sufficient diameter, only one ball 72 can support the pressing load.

Figure 5:
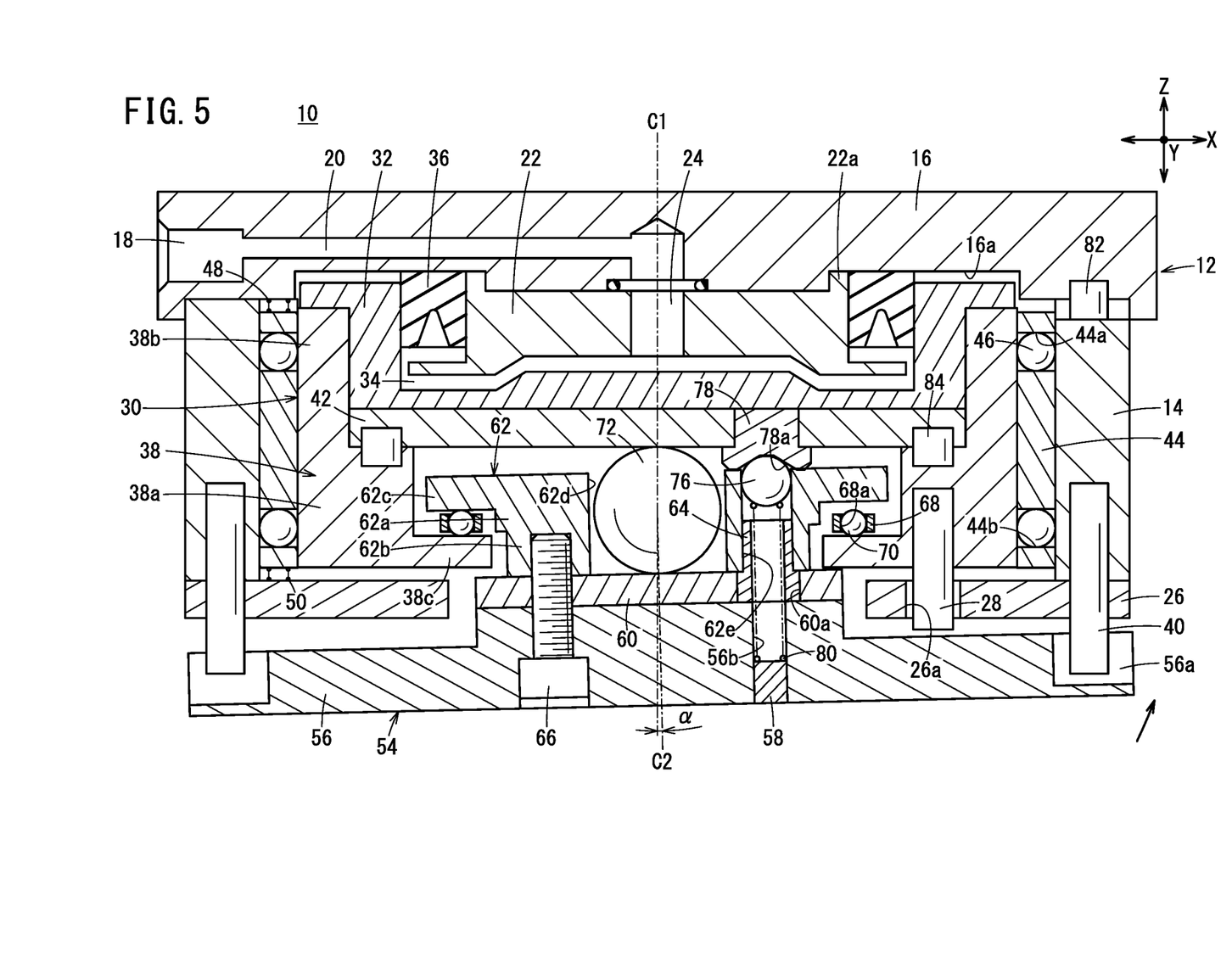
FIG. 5 is a cross-sectional view when the compliance unit of FIG. 1 absorbs an error concerning the inclination.
Figure 6:
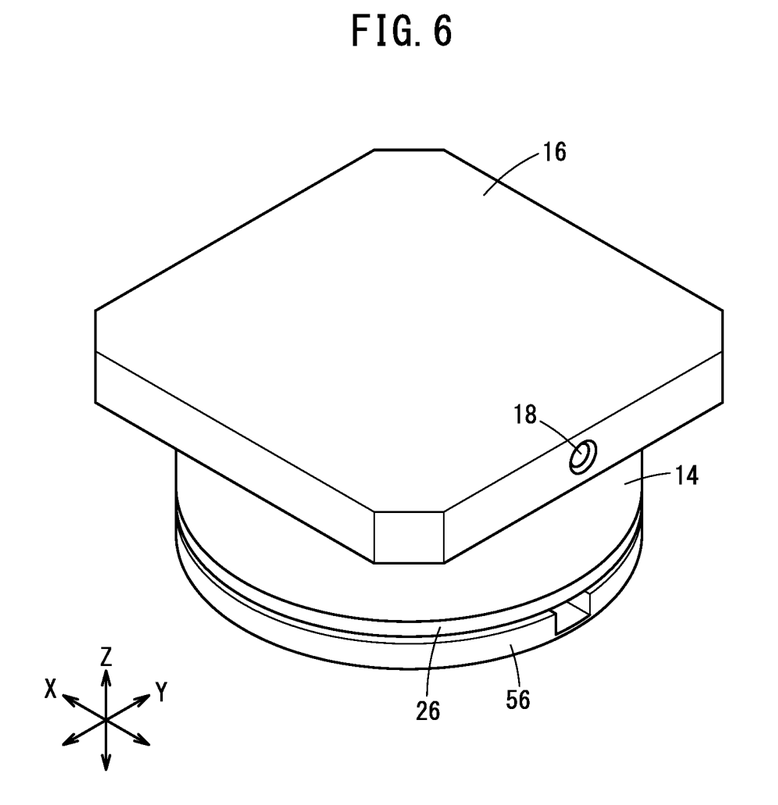
FIG. 6 is an external view of the compliance unit of FIG. 1.

The compliance unit 10 can absorb an error concerning the inclination of the table portion 54 (inclination of the table portion 54 with respect to the workpiece) in a state in which a pressing force is applied to the table portion 54. FIG. 5 shows a state in which the table portion 54 pivots about the Y-axis, the axis C2 of the table portion 54 intersects the axis C1 of the slide portion 30 at an angle α, and an error concerning the inclination is absorbed.

As shown in FIG. 5, the second ball 72 is in contact with the ball receiving plate 60 of the table portion 54 and the ball receiving plate 42 of the slide portion 30. Among the plurality of first balls 70, only the first ball 70 positioned at the left end abuts on the flange portion 62c of the base plate 62 and is sandwiched between the flange portion 62c of the base plate 62 and the flange portion 38c of the slide body 38. The other first balls 70 are separated from the flange portion 62c of the base plate 62. The return ball 76 is in contact with the ball receiving surface 78a at a position slightly deviated from the apex of the ball receiving surface 78a.

The compliance unit 10 can also absorb an error in the Z direction, making use of the sum of the movement amount of the slide portion 30 with respect to the body portion 12 and the movement amount of the table portion 54 with respect to the slide portion 30. Further, in a state in which a pressing force is applied to the table portion 54, the compliance unit 10 can absorb an error in the XY plane and also absorb an error concerning the inclination of the table portion 54.

According to the compliance unit 10 of the present embodiment, the table portion 54 can be tilted with respect to the slide portion 30, and errors concerning the inclination can be absorbed. Further, a configuration in which the table portion 54 can be moved relative to the slide portion 30 in the XY plane and the table portion 54 can be tilted relative to the slide portion 30 can be realized in a compact size.

The compliance unit according to the present invention is not limited to the above-described embodiment, and various configurations can be adopted without departing from the gist of the present invention.

The invention claimed is:

1. A compliance unit comprising a body portion, a slide portion, and a table portion,
wherein
a retainer that holds a plurality of first balls is arranged between a slide body constituting the slide portion and a base plate constituting the table portion,
the plurality of first balls are arranged around an axis of the slide portion that coincides with a Z-axis,
a single second ball is arranged on the axis of the slide portion between a first ball receiving plate constituting the slide portion and a second ball receiving plate constituting the table portion,
the table portion is movable in a XY plane with respect to the slide portion,
the table portion is tiltable with respect to the slide portion,
the second ball is configured to roll on the first ball receiving plate and the second ball receiving plate, in order to absorb errors in the XY plane in a state where a pressing force is applied to the table portion, and
the second ball is configured to abut against the first ball receiving plate and the second ball receiving plate and a part of the plurality of first balls is sandwiched between the base plate and the slide body, in order to absorb errors concerning inclination of the table portion in a state where a pressing force is applied to the table portion.

2. The compliance unit according to claim 1, wherein
the slide portion is movable in a Z-direction with respect to the body portion, and
a further retainer that holds a plurality of guide balls is arranged between the body portion and the slide body.

3. The compliance unit according to claim 2, wherein
a pressure chamber is formed between the body portion and the slide portion, and
the body portion includes a supply and discharge port that supplies and discharges air to and from the pressure chamber.

4. The compliance unit according to claim 1, further comprising a return mechanism that returns the table portion to an original position with respect to the slide portion and returns the table portion to an original posture with respect to the slide portion.

5. The compliance unit according to claim 4, wherein
the return mechanism includes:
a ball receiving body that includes a tapered ball receiving surface;
a return ball that comes into contact with the ball receiving surface; and
a return spring that urges the return ball toward the ball receiving surface.

6. The compliance unit according to claim 5, wherein
the ball receiving body is attached to the first ball receiving plate of the slide portion, and
the return spring is attached to the table portion.

\* \* \* \* \*